United States Patent [19]

Wilson

[11] E Patent Number: Re. 32,614

[45] Reissued Date of Patent: Mar. 1, 1988

[54] SELF-ADJUSTING LOCKING WRENCH

[75] Inventor: Neill R. Wilson, Berryville, Va.

[73] Assignee: Christopher B. Fagan, Cleveland, Ohio

[21] Appl. No.: 930,683

[22] Filed: Nov. 12, 1986

Related U.S. Patent Documents

Reissue of:

[64] Patent No.: 4,499,797
Issued: Feb. 19, 1985
Appl. No.: 443,135
Filed: Nov. 19, 1982

[51] Int. Cl.[4] ..... B25B 7/12

[52] U.S. Cl. ..... 81/367; 81/375; 81/380

[58] Field of Search ..... 81/367–380

[56] References Cited

U.S. PATENT DOCUMENTS

| | | | |
|---|---|---|---|
| 2,574,676 | 11/1951 | Waterburg | 81/369 |
| 2,661,648 | 12/1953 | Jones | 81/368 X |
| 3,354,759 | 11/1967 | Cook | 81/370 X |
| 3,496,808 | 2/1970 | Schmidt | 81/370 |

*Primary Examiner*—Debra Meislin
*Attorney, Agent, or Firm*—Fay, Sharpe, Beall, Fagan, Minnich & McKee

[57] ABSTRACT

A wrench includes an upper jaw integral with a handle and a force multiplying cam member pivotally mounted on the handle. A lower jaw has a pivot point for pivoting relative to the cam member and the upper jaw. A sliding bar is mounted inside the handle to slide with respect thereto. A free end of a first toggle linkage member is pivotally connected to an ear of the lower jaw and a free end of a second toggle linkage member is pivotally connected to the sliding bar so that the pivot point can move relative to the handle. A tension spring extends between the ear and the lower jaw to urge it away from the upper jaw. An extension integral with the first toggle member forms a second handle coextensive with the first handle and cooperates therewith to move the jaws toward each other as the handles are squeezed together. Such movement continues until the jaws contact an associated object. Continued squeezing of the handles causes the second toggle member to move the sliding bar back from the upper jaw. A manually actuated member can rotate the cam member into contact with the sliding bar thereby inhibiting further sliding movement thereof. Continued squeezing of the handle increases the force applied to the pivoted jaw which, in turn, applies increased rotational force to the cam member as the toggle members are moved to an over-center position to lock the wrench on the object.

19 Claims, 5 Drawing Figures

SELF-ADJUSTING LOCKING WRENCH

Matter enclosed in heavy brackets [ ] appears in the original patent but forms no part of this reissue specification; matter printed in italics indicates the additions made by reissue.

*This application is a reissue of U.S. Pat. No. 4,499,797 which issued on Feb. 19, 1985.*

BACKGROUND AND SUMMARY OF THE INVENTION

This invention is directed to a wrench of the locking type which will grip objects of various sizes and hold these objects without the necessity of the wrench operator constantly applying force to the handles of the wrench. An over-center toggle type linkage is used to hold a lower pivoted jaw relative to an upper fixed jaw.

The primary object of this invention is to provide a wrench that automatically self-adjusts itself to various size objects. The wrench operator does not have to adjust a screw or other adjustment means before gripping an object.

Another object of this invention is to provide a wrench that in addition to self-adjusting to various sizes is also capable of gripping objects with a wide variation in clamping force. The degree of force applied to an object is controlled each time the wrench is closed or used by merely applying pressure on a special force control lever provided on the wrench.

Yet another object of this invention is to provide a wrench that lends itself to one hand operation. In one variation the wrench is provided with a force control lever on the top forward part of the upper handle, where it can be operated with ones thumb, while the wrench handles are closed by using ones hand and fingers. In standard manually adjusted wrenches of this type (A well-known brand or trade name of these standard wrenches is Vice-Grip.), the adjustment screw must be adjusted and often re-adjusted prior to use, and/or the adjustment screw must be turned with one hand while some force is applied to the wrench handles with the other hand to thereby arrive at a reasonable adjustment. In many circumstances (such as when parts must be held) this type of manual adjustment is very difficult or impossible.

BRIEF DESCRIPTION OF THE DRAWINGS

Other features and advantages of the pliers or wrench of the present invention will be apparent from the following detailed description taken in connection with the accompanying drawing in which.

DETAILED DESCRIPTION OF THE PREFERRED EMBODIMENT

Figure 3:
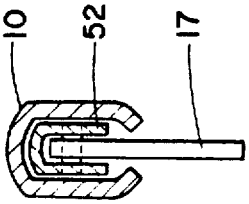
FIG. 3 is a sectional view of an intermediate portion of the assembled wrench with sliding bar therein as shown in FIG. 1.
Figure 2:
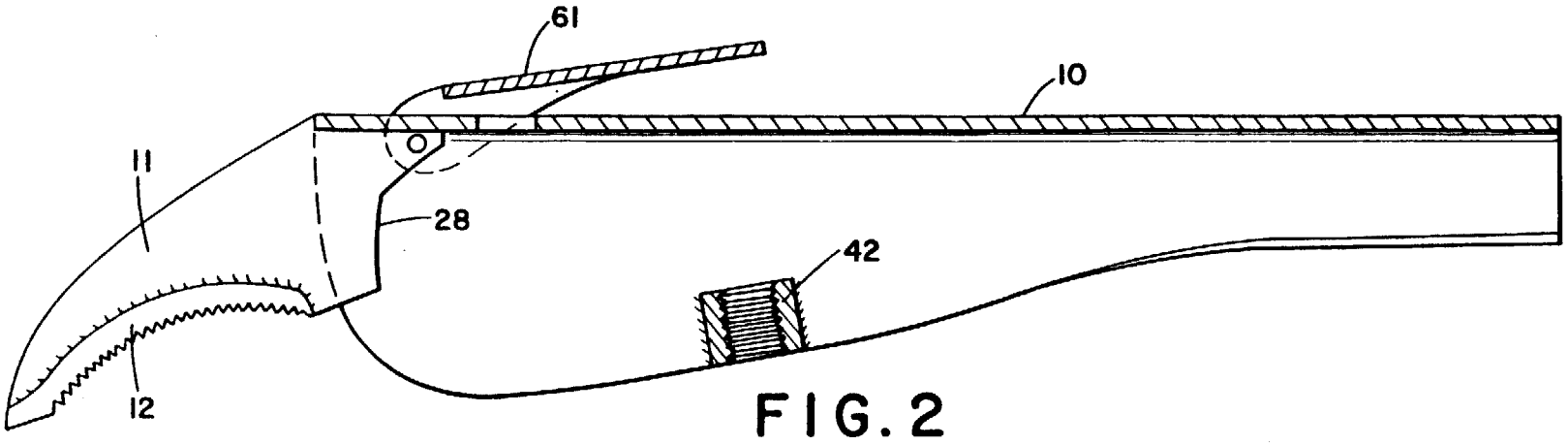
FIG. 2 is an elevational view of the upper handle 10 in section with attached fixed jaw 11 and attached nut 42.
Figure 4:
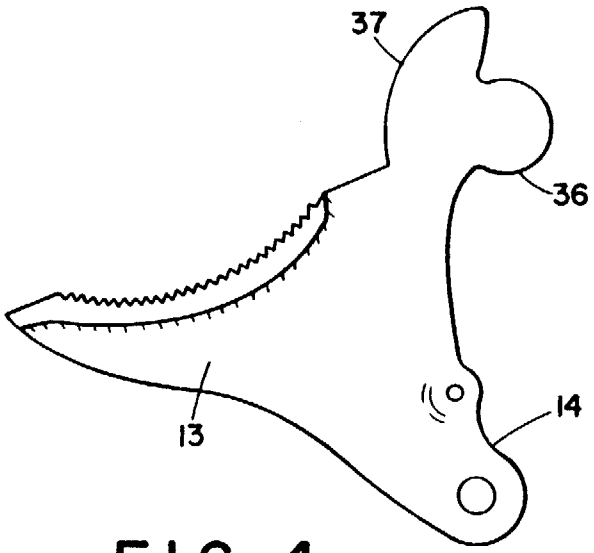
FIG. 4 is an elevational view of the movable jaw 13 as it would appear removed from the wrench.
Figure 5:
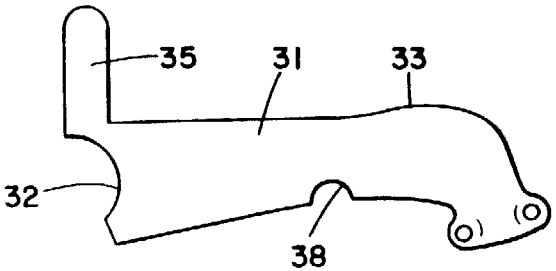
FIG. 5 is an elevational view of the cam bar 31 as it would appear removed from the wrench.

The wrench of the present invention, referring now to the drawings, comprises a lever 10 forming a handle for a jaw 11 which due to the normal action of the wrench will be hereinafter referred to as the fixed jaw. The lever 10 may be formed of some suitable metal in any member desired but as clearly shown in FIG. 3 is channel-shaped throughout its intermediate portion as well as at the end carrying the jaw.

The jaw 11 is faced with a hard metal plate 12 provided with teeth or serrations along the work engaging face thereof. The plate forming the work engaging element 12 is welded or otherwise permanently fixed to the jaw 11.

The movable jaw 13 of the wrench comprises a drop forging or similarly formed member. This jaw is pivotally attached to the forward end of cam bar 31 by means of a cylindrical pivot surface 36 formed on the jaw which interfits with a cylindrical cut 32 formed in the end of cam bar 31. Jaw 13 is retained in pivotal relation with cam bar 31 when the wrench is assembled by means of the additional cylindrical surface 37 provided on the jaw. Surface 37 is concentric with surface 36 and is formed with a radius that permits it to just clear the inside surface 28 of fixed jaw 11. The free end of jaw 13 has a hardened work engaging serrated face that cooperates with face 12 on fixed jaw 11 to grip objects.

As stated above a portion of movable jaw 13 is retained inside of handle 10 by being retained between cam bar 31 and the inside surface 28 of fixed jaw 11. Cam bar 31 is in turn pivotally retained inside of handle 10 by means of a cylindrical surface 38 provided by the lower edge of bar 31, wherein surface 38 interfits with the spherical head 39 provided on threaded stud 41. Stud 41 is threaded into a nut 42 that is welded to the inside surface or surfaces of handle 10. The provision of this threaded stud 41 allows the pivot point between cam bar 31 and handle 10 to be adjustable to take up for wear in various parts. An interference fit is provided within the threads of stud 41 to prevent unwanted movement of the stud.

In addition to cam bar 31, a sliding bar 51 is positioned inside of handle 10. Sliding bar 51 has an elongated forward end which slides in above cam bar 31 and is thereby sandwiched between the cam bar and the top inside surface of handle 10. Sliding bar 51 has a channel shaped back end 52 which interfits with the other end of toggle link 17. Pivot pin 54 provides a permanent pivotal connection between bar 51 and link 17. A tension spring 57 is provided between sliding bar 51 and the outer or back end of cam bar 31 which tends to pull and maintain sliding bar 51 into a forward position.

Figure 1:
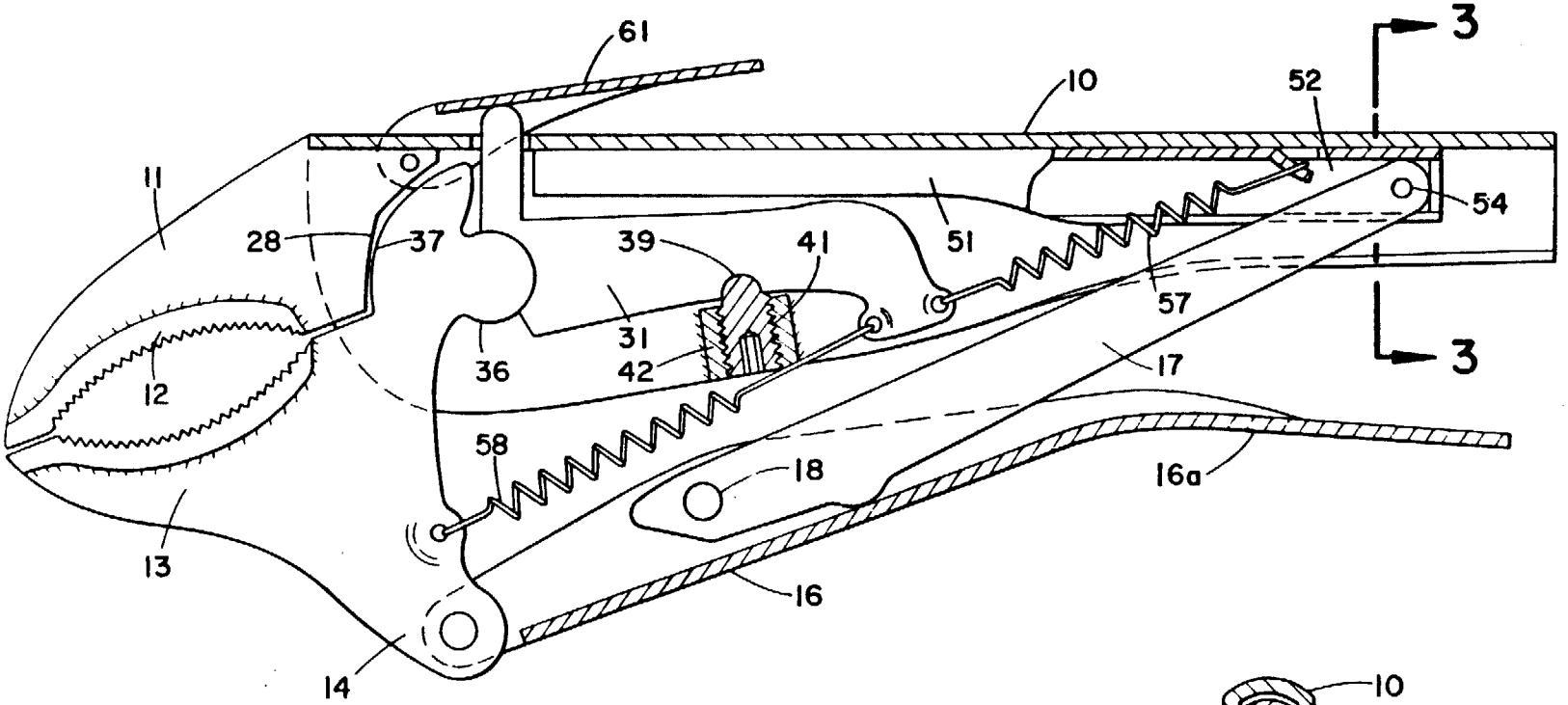
FIG. 1 is an elevational view of the wrench in section to more clearly illustrate the same and showing the pliers or wrench with jaws thereof locked.

The movable jaw 13 is actuated by means of two over-center type toggle links. One link is actually a lever 16 pivotally connected by a pin, at one end thereof to an ear 14 formed integral with the jaw 13 and at its opposite end (once again by a pivot pin) to the lower end of the other link 17 of the two toggle links. The lever 16 is formed with an extension 16a which serves as a handle member. Handle 16a is used in conjunction with upper handle 10 to operate the tool. The second link 17 is pivotally connected to link or lever 16 intermediate the ends thereof by pivot pin 18 and therefore the two links as operated by the handle end 16a of link 16 to form a toggle linkage which rotates movable jaw 13 in a clockwise direction (as shown in FIG. 1) as handle 16a is squeezed upwardly toward handle 10 by the tool operator. When handle 16a is forced downwardly to open the wrench, movable jaw 13 will rotate in a counterclockwise direction (about pivot surface 36) to thereby open the jaws. Jaw 13 is caused to rotate and thereby open due to the provision of tension spring 58 which extends from the ear portion of jaw 13 up to an anchor point on handle 10 or an anchor point on cam bar 31 (as shown in FIG. 1).

In operation of this wrench the operator must first flick down handle (lever) 16a relative to handle 10. This action allows movable jaw 13 to rotate counterclockwise (due to pull exerted by spring 58) whereby the jaws are opened. Next the object to be gripped is placed between the jaws and one hand is used to squeeze handle 16a upwardly toward handle 10. This squeezing action rotates movable jaw 13 in a clockwise direction until the object being gripped is contacted and forced against fixed jaw 11. At this point the operator continues to squeeze handle 16a toward handle 10 thereby forcing the toggle links more toward their closed position. Since jaw 13 has essentially stopped, the upper end of toggle link 17 must move back relative to handle 10. Continued squeezing thereby forces sliding bar 51 to move back relative to handle 10, because it is pivoted to the upper end of link 17.

At this point in operation it is desirable to apply added force to the object being gripped and in order to do this the rearward sliding movement of sliding bar 51 must be braked or inhibited.

Cam bar 31 is provided to cam against and brake the rearward movement of sliding bar 51. Cam bar 31 is provided on its upper surface with a camming surface 33 which rubs against the lower surface of sliding bar 51. When cam bar 31 is rotated or rocked a slight amount in a counterclockwise direction about its pivot surface 38, the camming surface 33 is forced up against the bottom surface of sliding bar 51, whereby bar 51 is gripped between camming surface 33 and the inside of handle 10.

Manual means [which includes the upstanding projection 35 (on cam bar 31) and the thumb lever 61 provided on the top handle 10], are provided to exert an initial force on the cam bar at any desired instant in the operation of the tool. At the point in closing or squeezing of the handle when it is desired to brake movement of sliding bar 51 and thereby apply force on the object being gripped, the operator applies a downward force on lever 61 with his thumb. This action in turn forces down the forward end of cam bar 31 a slight amount thereby rotating bar 31 a slight amount. Cam surface 33 (on bar 31) is thereby forced up against and brakes the rearward movement of sliding bar 51. This initial braking of sliding bar 51 then sets up a chain reaction in the wrench. This occurs because as the operator squeezes the toggle links more toward their over-center position more force is applied to movable jaw 13 by link 16. This additional force tends to rotate jaw 13 about an axis extending through its point of contact with the object being gripped. Very little movement actually occurs, but the little that does occur urges the pivot surface 36, on jaw 13 downwardly against the forward end of cam bar 31 with a great deal of force. This additional force on bar 31 thereby forces camming surface 33 (on bar 31) up against the sliding bar 51 even more to thereby stop all rearward movement of bar 51.

The toggle links are thereafter forced on to their over-center position and the wrench is in a locked state.

In order for this tool to operate properly, the spring [rate] *modulus* of spring 57 must be selected to be greater than the [rate] *modulus* of spring 58 (e.g., the jaw must move to a closed position before the sliding bar begins to move back).

In actual operation, the lock up force exerted by the jaws is determined each time the tool is used by the point at which an operator applies a force on lever 61. By this I mean that sometime during closing or squeezing of handles 16a and 10 the operator will apply a force with his thumb on lever 61 and the selection of time during closing and degree of force applied to lever 61 will determine the lock up force applied. A few trial operations of the tool will provide any operator with a feel for the operation of the tool.

Although the now preferred embodiment of the present invention has been shown and described herein it is to be understood that the invention is not to be limited thereto for it is susceptible to changes in form and detail within the scope of the appended claim. For instance the force control lever 61 could be modified and placed on or pivoted on link 17 (rather than on top of the tool) in such a manner that force could be applied to the lower surface of the back end of cam bar 31 to in turn press cam surface 33 up against the sliding bar. This structure may have merit because the force control lever could also double as a wrench release or unlocking lever. Release or unlocking levers of this type are shown in U.S. Pat. No. 2,574,676 and are currently used on the locking wrenches or pliers being sold by Sears, Roebuck & Co.

The invention have been described with reference to a preferred embodiment. Obviously, modifications and alterations will occur to others upon the reading and understanding of this specification. It is intended to include all such modifications and alterations insofar as they come within the scope of the appended claims or the equivalents thereof.

What I claim is:

1. A wrench comprising:

a first handle having a fixed upper jaw integral therewith, a force multiplying cam member pivotally mounted on said handle, a movable lower jaw having a pivot point for pivoting against said cam member to enable said lower jaw to move relative to said cam member and said upper jaw, said lower jaw also having an ear, sliding bar means mounted inside said handle and adapted to slide with respect to said handle, toggle linkage means including two pivotally interconnected elongate members, a free end of a first linkage member being pivotally connected to said ear, a free end *of* a second linkage member being pivotally connected to said sliding bar means whereby said pivot point is movable relative to said handle, a tension spring having one end fixed to said ear and having the other end operatively connected to said handle whereby said movable jaw is urged away from said fixed jaw, an extension integral with said first linkage member, said extension forming a second handle substantially coextensive with said first handle and cooperative therewith to move said toggle linkage means and move said jaws toward each other as said handles are squeezed together, such movement continuing until said jaws contact an associated object, and whereby, after such contact, continued handle squeezing causes the second linkage member to urge said sliding bar means to move back away from said upper jaw, and means operatively connected to said handle for actuating said cam member to cause said cam member to rotate and contact with *said* sliding bar means and thereby inhibit further sliding movement thereof, whereby continued squeezing of said handles increases the force applied to said lower jaw which in turn applies an increased rotational force through its pivot point to the cam member which in turn more securely contacts said sliding bar means and inhibits further rearward movement thereof as said toggle linkage means are moved to an over-center position to lock the wrench on the associated object.

2. A locking type wrench comprising:

an elongated first handle provided with an integral fixed upper jaw at a forward end thereof;

a cam member pivotally mounted on said first handle;

a movable bar adapted to slide against a surface of said first handle and positioned rearwardly of said upper jaw;

a movable lower jaw cooperable with said upper jaw and pivotable against said cam member, said upper and lower jaws having opposed gripping faces adapted to grip an associated object; [resilient means adapted to urge said lower jaw away from said upper jaw;]

a second handle pivotally secured to said lower jaw and forming a first toggle link in a toggle joint;

a second toggle link pivotally engaged at a first end with said second handle and at a second end with said movable bar, said two handles being movable toward each other in order to bring said two jaws into a gripping engagement with said associated object, continued movement of said handles toward each other causing said second toggle link to slide said movable bar along said first handle surface away from said upper jaw; and, cam actuating means for rotating said cam member with respect to said first handle while said handles are being moved toward each other until said cam member contacts said movable bar to prevent it from sliding further, continued movement of said handles actuating said toggle joint to an over-center condition to lock the wrench on said associated object.

3. The wrench of claim [2] *15* wherein said resilient means includes a first tension spring connected at a first end to said lower jaw and at a second end to said cam member.

4. The wrench of claim 3 wherein said resilient means includes a second tension spring connected at a first end to said cam member and at a second end to said movable bar.

5. The wrench of claim 4 wherein a spring [rate] *modulus* of said second spring is greater than a spring [rate] *modulus* of said first spring.

6. The wrench of claim 3 wherein said lower jaw has a lower ear section, to which said first tension spring is connected, and an upper ear section having a convex pivoting surface which cooperates with a concave surface of said cam member to enable said lower jaw to pivot against said cam member.

7. The wrench of claim 2 wherein said cam actuating means is actuatable with the same hand which grips said two handles thus enabling one hand to control the operation of the wrench.

8. The wrench of claim 7 wherein said cam actuating means is a lever which is pivotally secured to said first handle member.

9. The wrench of claim 8 wherein said lever contacts and urges downwardly an upward projection of said cam member, said upward projection extending through an aperture in an upper surface of said first handle.

10. The wrench of claim 2 wherein said toggle link can adjust the location of said first and second [handle] *handles* and hence said upper and lower jaws so that associated objects of various sizes can be gripped.

11. The wrench of claim 2 wherein the degree of clamping force applied to said associated object is dependent on when said cam actuating means is operated to rotate said cam member during the movement of said movable bar to stop the movement thereof.

12. The wrench of claim 2 wherein said cam member is pivotally mounted on stud means secured to said first handle.

13. The wrench of claim 12 wherein said stud means includes:

a threaded stud having a convex upper surface which cooperates with a concave surface on said cam member; and, a nut secured to said first handle, said stud being threaded in said nut.

14. The wrench of claim 13 wherein said stud can be adjusted in said nut to allow adjustment of a point of pivoting of said cam member on said first handle thereby allowing a take-up for wear in [the several elements] *said cam member, said movable bar, said second toggle link and said cam actuating means* of the wrench.

*15. The wrench of claim 2 further comprising resilient means adapted to urge the lower jaw away from the upper jaw.*

*16. The wrench of claim 2 wherein said cam member is spaced from said movable bar until acted on by said cam actuating means.*

*17. The wrench of claim 2 further comprising a pivot means, secured to said first handle, for enabling said cam memer to pivot in relation to said first handle.*

*18. A locking type wrench adapted for one-handed operation comprising:*

*an elongated first handle provided with a fixed upper jaw at a forward end thereof and a handle body including a top wall and a pair of opposed side walls;*

*a pivotable bar pivotally mounted on said first handle;*

*a slidable bar held in said handle body and adapted to slide against said first handle body top wall, said bar being positioned rearwardly of said upper jaw;*

*a movable lower jaw which is adapted to cooperate with said upper jaw, said upper and lower jaws having opposed gripping faces adapted to grip an associated object;*

*an interaction means for contacting said lower jaw with said pivotable bar to cause a movement of said lower jaw when said pivotable bar is pivoted;*

*a second handle pivotally secured to said lower jaw and forming a first toggle link in a toggle joint;*

*a second toggle link pivotally engaged at a first end with said second handle and at a second end with said movable bar, said two handles being slidable toward each other in order to bring said two jaws into gripping engagement with the associated object, and wherein*

*movement of said handles toward each other causes said second toggle link to slide said movable bar along said first handle body top wall away from said upper jaw; and,*

*manually operated pivotable bar actuating means for rotating said pivotable bar with respect to said first handle while said handles are being moved toward each other, continued rotation of said pivotable bar by said pivotable bar actuating means causing said pivotable bar to engage said slidable bar and prevent any further sliding thereof, continued movement of said handles after said pivotable bar engages said slidable bar actuating said toggle joint to an over-center condition to lock the wrench on the associated object.*

*19. The wrench of claim 18 further comprising a pivot member secured to said first handle to enable said pivotable bar to pivot around said pivot member.*

* * * * *